(12) United States Patent
Carter

(10) Patent No.: US 8,484,321 B2
(45) Date of Patent: *Jul. 9, 2013

(54) NETWORK EVALUATION GRID TECHNIQUES

(75) Inventor: Stephen R. Carter, Spanish Fork, UT (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/435,570

(22) Filed: Mar. 30, 2012

(65) Prior Publication Data

US 2012/0191852 A1 Jul. 26, 2012

Related U.S. Application Data

(63) Continuation of application No. 11/771,709, filed on Jun. 29, 2007, now Pat. No. 8,166,138.

(51) Int. Cl.
*G06F 15/177* (2006.01)
*G06F 15/173* (2006.01)

(52) U.S. Cl.
USPC .................. 709/220; 709/223; 709/224

(58) Field of Classification Search
USPC ............. 709/202, 208, 220, 223, 224, 226
See application file for complete search history.

(56) References Cited

U.S. PATENT DOCUMENTS

| 6,317,788 | B1 | 11/2001 | Richardson |
| 6,816,903 | B1 | 11/2004 | Rakoshitz |
| 7,010,596 | B2 | 3/2006 | Bantz et al. |
| 7,464,159 | B2 | 12/2008 | Di Luoffo et al. |
| 7,467,303 | B2 | 12/2008 | Keohane et al. |
| 7,493,387 | B2 | 2/2009 | Creamer et al. |
| 7,554,983 | B1 | 6/2009 | Muppala |
| 7,644,408 | B2 | 1/2010 | Kroening |
| 7,668,741 | B2 | 2/2010 | Ernest et al. |
| 2002/0078381 | A1 | 6/2002 | Farley et al. |
| 2003/0216971 | A1 | 11/2003 | Sick et al. |
| 2004/0225711 | A1* | 11/2004 | Burnett et al. ............. 709/201 |
| 2005/0027812 | A1 | 2/2005 | Bozak et al. |
| 2005/0131993 | A1* | 6/2005 | Fatula, Jr. ............. 709/202 |
| 2005/0246547 | A1 | 11/2005 | Oswald et al. |
| 2006/0005181 | A1 | 1/2006 | Fellenstein et al. |
| 2006/0277307 | A1 | 12/2006 | Bernardin et al. |
| 2006/0294238 | A1 | 12/2006 | Naik et al. |
| 2007/0061277 | A1 | 3/2007 | Boden et al. |
| 2009/0006592 | A1 | 1/2009 | Carter |

OTHER PUBLICATIONS

"Viewpoint on Grid Computing", CIO Focus—Executive Guides for Strategic Decision Making, (2006), 1-13.

* cited by examiner

*Primary Examiner* — Aaron Strange

(74) *Attorney, Agent, or Firm* — Park, Vaughan, Fleming & Dowler, LLP

(57) ABSTRACT

Network evaluation grid techniques are presented. Local specifications for traffic patterns are evaluated for local traffic on local grids of a grid computing environment and reported out. The local traffic reported out is then evaluated in response to global traffic pattern specifications and a global traffic policy in order to identify one or more remedial actions to take or to recommend in response to that evaluation.

18 Claims, 4 Drawing Sheets

NETWORK EVALUATION GRID TECHNIQUES

RELATED APPLICATIONS

The present Application is a continuation of, claims priority to, and is with application Ser. No. 11/771,709, entitled: "Network Evaluation Grid Techniques," filed on Jun. 29, 2007 now U.S. Pat. No. 8,166,138, which presently stands allowed and the disclosure of which is incorporated by references in its entirety herein and below.

FIELD

The invention relates generally to data processing. More particularly, the invention relates to network evaluation grid techniques.

BACKGROUND

The Internet has revolutionized the Industrial economy in a variety of ways. For instance, now business and personal affairs can be conducted in remote corners of the globe via some network link, such as phone, cable, cellular, satellite, radio frequency, etc. Moreover, the devices that support Internet transactions have been blurred such that now it is not just a computer that permits processing capabilities and connectivity to the Internet; in fact, nearly any conceivable device can connect to the Internet, such as a phone, a personal digital assistant, a car, a watch, a gaming device, a household appliance, etc.

Furthermore, there are even techniques that can address situations where a particular processing need of an enterprise or individual exceeds the existing processing capabilities of their devices. This is referred to as grid computing. Essentially, participating computers over the Internet permit processes to be executed on those computers using their excess and available capacity. This has blurred what is considered a computer, in that now a computer can be viewed as a collection of geographically dispersed processing devices that cooperate with one another to achieve a specific task. Additionally, a task that may have taken a day to complete given its complexity can now be completed in mere minutes by dispersing the processing and memory needs to a plurality of participating and cooperating processing devices over a network, such as the Internet.

Yet, to date grid computing has focused on distributed processing and has not attempted to provide any centralized and automated monitoring and management of network traffic associated with grid computing. Utilizing such capabilities will reveal a variety of security holes and support/maintenance issues in the network being evaluated.

Thus, what are needed are network evaluation grid techniques, which allow for improved management and usage of networks.

SUMMARY

In various embodiments, network evaluation grid techniques are presented. More specifically, and in an embodiment, a method is provided for monitoring and reporting network traffic in the vicinity of grid computers. Grid services, which are distributed over a network for processing on a plurality of devices, are identified. The plurality of devices combine to form a grid computing environment and selective collections of the devices combine to form a particular grid of the grid computing environment. Traffic pattern specifications are obtained for one or more of the following: a particular one of the grid services, selective groupings of the grid services, the particular grid, selective groupings of the grids, and the grid computing environment as a whole. Further, a watch grid service is configured and distributed according to policy in the grid computing environment. When a particular grid service is initiated on a particular device of the particular grid, the particular watch grid service listens for and reports on network traffic in response to enforcement of particular ones of the traffic pattern specifications.

DETAILED DESCRIPTION

Figure 1:
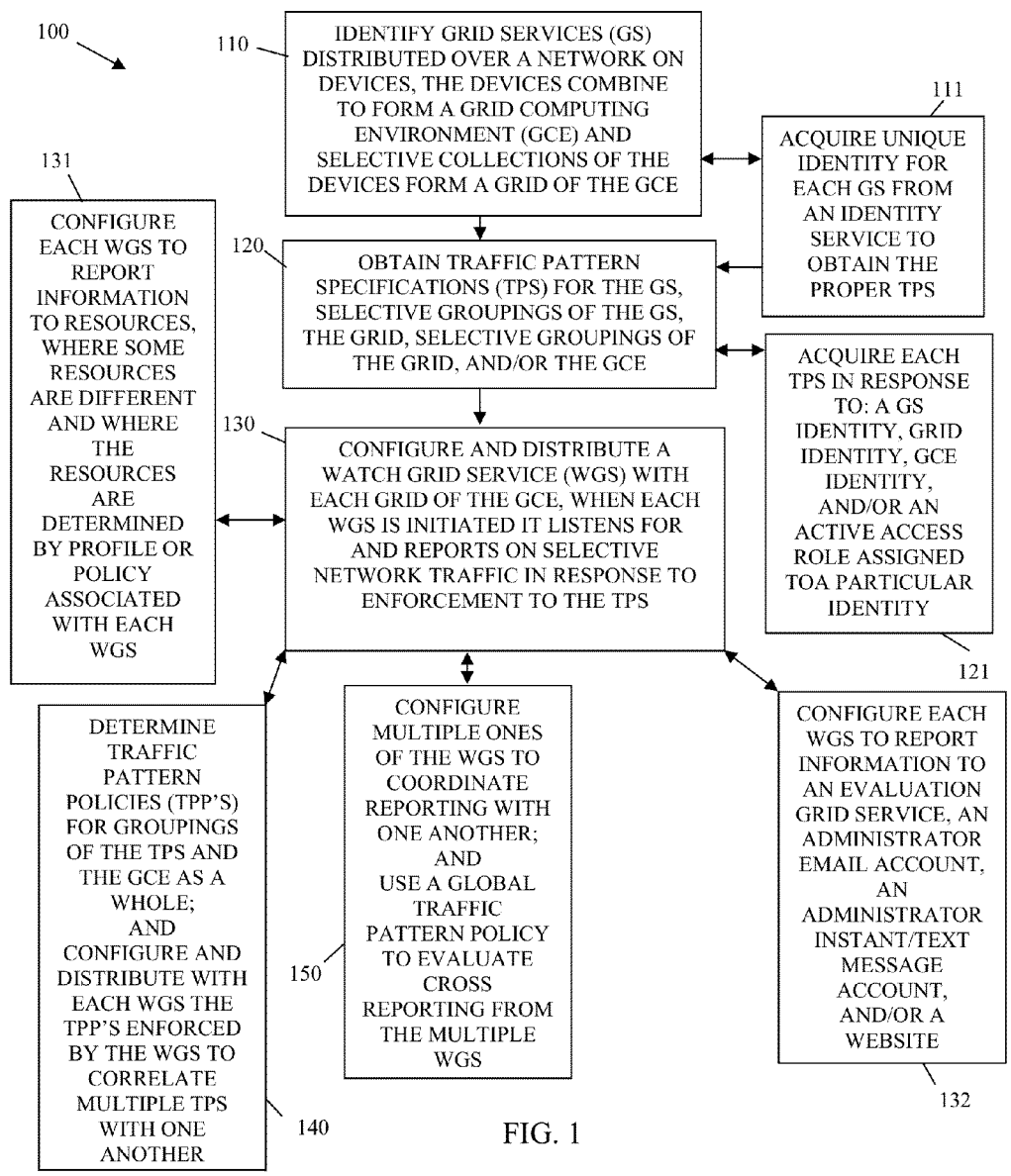
FIG. 1 is a diagram of a method for monitoring and reporting network traffic associated with a network grid computing environment, according to an example embodiment.

A "grid" refers to a collection of cooperating processing devices, such as but not limited to computers. The collection of devices have been configured and agreed upon a mechanism to work together and share some resources (e.g., software services, memory, processing capabilities, etc.). Thus, a grid may be viewed as a collection of processing devices within a same network with one another.

Multiple grids combine to form a "grid computing environment." The grids of the grid computing environment can span the entire globe. In fact, there is no geographical limitation on the grid computing environment. The only limitation is that the grids that comprise the grid computing environment be networked together, such as via a Wide Area Network (WAN) (e.g., Internet, World-Wide Web (WWW), etc.).

Each grid includes multiple "grid members." A grid member is a specific processing device or resource that is uniquely addressable within the grid to which it relates. For example, a grid member may be viewed as a computer within a specific LAN (grid) that is connected to the Internet and is a member of a grid computing environment.

A "traffic pattern specification" refers to a special type of data structure or script that defines network traffic of interest. The specification can be created in an automated fashion using graphical user interface (GUI) tools and is predefined. The precise contents of the traffic pattern specification are tailored according to the needs and desires of an enterprise or network grid administrator. Moreover, the format of the specification is configurable and can be any stable and consistent data format, such as but not limited to extensible markup language (XML), etc. Moreover, in some embodiments, the specification itself is in an XML data definition (XSD) format.

Multiple traffic pattern specifications exist. That is, a traffic pattern specification exists for a specific grid and for the entire network grid computing environment as a whole. The specification identifies grid members and their subnets (LAN's). This permits traffic emanating from the local environments of the grid members to be sniffed out and monitored independent of the resources that produce that traffic. The specification can also include specific traffic patterns or classes of traffic that are to be monitored. The specification informs and directs watch grid services, which are monitoring specific grids, on what types and patterns of traffic are of interest and should be reported out. The details of this is described more completely herein and below.

A "traffic pattern policy" is another type of special data structure or script that permits multiple specifications to be correlated with one another. Moreover, the policy identifies actions to take in response to detected traffic patterns of interest. Again, the policy can be in any desired or configured data format and can be developed via a variety of GUI tools in a semi-automated fashion.

As used herein a "resource" may include a user, a group of users (perhaps represented by a role assignment), a service, a system, a processing device, a peripheral device, a directory, a document, a specification, a policy, a storage device, a grid, a grid member, etc.

In various embodiments presented herein, resources are assigned identities for defined contexts. An identity for a given resource is unique within a given context. Each resource may have more than one identity. Resource identifiers or identity information assist in defining a particular resource's identity. Identities can be semantic or crafted. An example of semantic identities is defined in U.S. patent application Ser. No. 11/261,970 entitled "Semantic Identities," filed on Sep. 28, 2005, commonly assigned to Novell® Inc., of Provo, Utah and the disclosure of which is incorporated by reference herein. An example of crafted identities is described in U.S. patent application Ser. No. 11/225,993 entitled "Crafted Identities," filed on Sep. 14, 2005, commonly assigned to Novell® Inc. of Provo, Utah and the disclosure of which is incorporated by reference herein.

In some cases, a third-party service identified as an identity service or an identity provider is used to authenticate identifiers or identity information of a resource and supply an identity for that resource within a given or requested context. Examples of identity services or identity providers may be found in U.S. Pat. No. 10/765,523 entitled "Techniques for Dynamically Establishing and Managing Authentication and Trust Relationships," filed on Jan. 27, 2004; U.S. Pat. No. 10/767,884 entitled "Techniques for Establishing and Managing a Distributed Credential Store," filed on Jan. 29, 2004; and U.S. Pat. No. 10/770,677 entitled "Techniques for Establishing and Managing Trust Relationships," filed on Feb. 3, 2004. Each of these commonly assigned to Novell® Inc. of Provo, Utah; and the disclosures of which are incorporated by reference herein.

A "processing environment" refers to one or more physical processing devices organized within a local network. For example, several computers connected via a local area network (LAN) may collectively be viewed as a processing environment, which also can be viewed as a particular grid. The processing environment also refers to software configurations of the physical processing devices, such as but not limited to operating system, file system, directory service, etc.

According to an embodiment, the techniques presented herein are implemented in products associated with Access Manager® and ZEN® distributed by Novell®, Inc. of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-5.

FIG. 1 is a diagram of a method 100 for monitoring and reporting network traffic associated with a network grid computing environment, according to an example embodiment. The method 100 (hereinafter "network grid traffic monitoring service") is implemented as instructions in a machine-accessible and readable medium. The instructions when executed by a machine (processing device) perform the processing depicted in FIG. 1. The network grid traffic monitoring service is also operational over and processes within a network. The network may be wired, wireless, or a combination of wired and wireless. In some cases, the network is a wide-area network (WAN), such as the Internet.

At 110, the network grid traffic monitoring service identifies grid services that are distributed over a network, such as but not limited to the Internet. The grid services are software instructions that execute on processing devices. Each processing device may be referred to herein as a grid member. Moreover, selective collections or LAN configurations of the grid members from a grid. Multiple grids combine to represent a grid computing environment.

The grid services perform any processing that is associated with a grid computing environment transaction or job. So, a job is represented as one or more grid services and each grid service is assigned to a particular grid member (processing device) for execution within a particular grid (LAN configuration). A single job can span grid members within the same grid or span grid members within different grids.

In an embodiment, at 111, the network grid traffic monitoring service acquires a unique grid service identity for each of the grid services from an identity service. The network grid traffic monitoring service uses the identities to obtain specific ones of the traffic pattern specifications, discussed below.

At 120, the network grid traffic monitoring service obtains traffic pattern specifications for a variety of resources. For example, a traffic pattern specification may be obtained for a particular one of the grid services, for selective groupings or associations of the grid services, for a particular grid, for selective groupings of the grids, for each available grid member, for selective groupings of grid members, and/or for the grid computing environment as a whole.

The traffic pattern specification defines network traffic and patterns that is to be monitored. It is predefined by an administrator or even perhaps an automated service capable of generating traffic pattern specifications. The traffic pattern specification was also discussed and defined above.

According to an embodiment, at 121, the network grid traffic monitoring service acquires each traffic pattern specification in response to a variety of identities. For example, the traffic pattern specifications can be obtained in response to an identity associated with a particular grid service, in response to an identity associated with a particular grid, in response to an identity associated with a particular grid member, in response to an identity associated with the grid computing environment as a whole, and/or in response to any particular active role assigned to any given identity discussed above. An identity service may be used to authenticate and to acquire the identities. In some cases, the identity service may also be used to distribute and acquire all or some of the traffic pattern specifications.

At 130, the network grid traffic monitoring service configures and distributes a watch grid service to or with each grid of the grid computing environment. Again, each grid represents a particular LAN of the entire grid computing environment. Further, the entire grid computing environment includes a plurality of different grids. The watch grid service is to watch all traffic on the grid to which it is assigned, and each grid includes a plurality of grid members and may in some cases be viewed as an entire logical subnet or even LAN of the overall network and grid computing environment. The subnet may be referred to as local segment of the entire network or grid computing environment.

The watch grid service is a special service that is designed to monitor network traffic within a particular grid and independent of any particular grid member of that grid or independent of any grid service that processes on a particular grid member. It is noted that all traffic on the local segment or grid is watched according to the traffic pattern specifications. The specifications define patterns within all the traffic occurring on the local segment (grid) that are of interest for reporting purposes, perhaps policy enforcement, etc. So, the traffic pattern specifications define for the watch grid service the types and patterns of traffic of interest along with the identities of particular grid services and/or grid members that generate that type of traffic. This permits selective portions of the traffic of interest to be culled out for reporting and subsequent action as desired.

When any particular watch grid service is initiated on a processing device within a grid having multiple grid members that process the grid services, the particular watch grid service listens for and reports on available network traffic. Again, each watch grid service is designed to monitor all traffic on the grid to which it is assigned and configured. This is done in accordance and in response to the dictates defined in the traffic pattern specifications, which each watch grid service is configured with and actively enforces.

In an embodiment, at 131, the network grid traffic monitoring service configures each watch grid service to report information to specific resources in response to the evaluation of the traffic pattern specifications. In some situations, one watch grid service may report to different resources from that of another watch grid service. Moreover, the specific resource receiving the information from any given watch grid service can be resolved or determined by the network grid traffic monitoring service based on a profile or a policy associated with each given watch grid service. It is also noted that any given watch grid service can report the same or different portions of the information to a single or to multiple different resources.

At 132, some example resources or targets of the information being reported by the network grid traffic monitoring service are depicted. This list is not intended to be exhaustive and is presented for purposes of illustration and comprehension. Thus, others may be used without departing from the beneficial teachings presented herein. Specifically, at 132, the network grid traffic monitoring service may configure each watch grid service to report information to an evaluation grid service (discussed in detail below with reference to the FIG. 2), an administrator's email account, an administrator's instant or text message account, and/or to a secure or insecure (based on policy) website.

According to an embodiment, at 140, the network grid traffic monitoring service determines traffic pattern policies in addition to the traffic pattern specifications. The traffic pattern policies relate to selective groupings or associations of the traffic pattern specifications and correlate multiple traffic pattern specifications with one another. In this way, combined patterns that can be temporarily independent can be detected by defining and using a policy to correlate two or more pattern specifications with one another. Some policies may be for the entire grid computing environment as well. The network grid traffic monitoring service configures each watch grid service with the policies and each watch grid service is responsible for enforcing and evaluating the policy on its grid that it is monitoring.

In other situation, at 150, the network grid traffic monitoring service configures multiple ones of the watch grid services to coordinate reporting and perhaps specification and policy enforcement with one another. A global policy may be used to evaluate cross traffic and reporting occurring between the two or more watch grid services. It is also noted that a single grid can have multiple watch grid services, where one watch grid service is configured to watch a subset of grid members and grid services of the grid and another watch grid service is configured to what a different subset of grid members and their grid services. This may be advantageous when the grid being monitored includes a large amount of traffic and/or many grid members or services. This can help in preventing any single watch grid service from becoming too loaded and thus increase reporting throughput.

Figure 2:
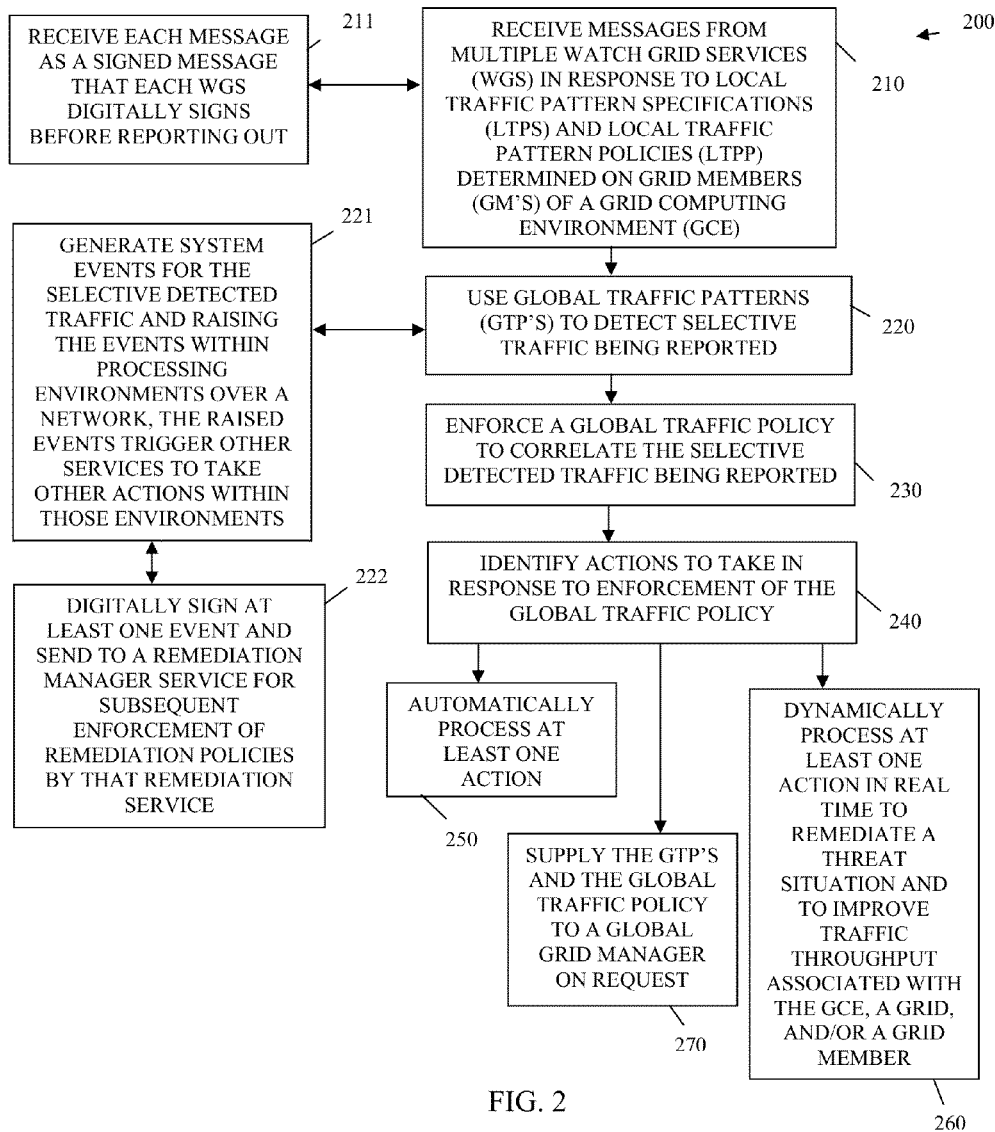
FIG. 2 is a diagram of method for evaluating network traffic that is being monitored from a network grid computing environment, according to an example embodiment.

Thus far the discussion has focused on monitoring network traffic occurring within a grid computing environment. FIG. 2 discusses the processing associated with the evaluation and the remediation of that traffic.

FIG. 2 is a diagram of method 200 for evaluating network traffic that is being monitored from a network grid computing environment, according to an example embodiment. The method 200 (herein after referred to as "network grid evaluation service") is implemented in a machine-accessible and readable medium as instructions, which when accessed by a machine performs the processing depicted in the FIG. 2. The network grid evaluation service is also operational over a network; the network may be wired, wireless, or a combination of wired and wireless. The network grid evaluation service represents actions taken in response to network traffic that is reported by the network grid monitoring service represented by the method 100 of the FIG. 1.

At 210, the network grid evaluation service receives messages from multiple watch grid services. Each watch grid service is associated with a particular grid (LAN) of a grid computing environment. Although, as discussed above, in some cases multiple grid services may cooperate to handle a same grid. Furthermore, each watch grid service reports network traffic occurring within the grid computing environment to which it is assigned. Each watch grid service reports and sends the messages in accordance with its configured traffic pattern specifications and policies. The manner and technique for achieving this configuration of the watch grid services was discussed in detail above with reference to the network grid monitoring service represented by the method 100 of the FIG. 1.

In an embodiment, at 211, the network grid evaluation service receives each message as a signed message from each watch grid service. That is, each watch grid service digitally signs each message before it is reported out to the network grid evaluation service. Again, an identity service may be used to acquire public and private keys and other certificate information between the network grid evaluation service and the watch grid services. Moreover, example identity services that support such features were discussed and incorporated herein by reference above.

At 220, the network grid evaluation service uses global traffic pattern specifications to detect selective traffic being reported. That is, global traffic pattern specifications are used to tie multiple messages on individual network traffic occurring from multiple different grids together. This can be done to find or detect global patterns occurring in the grid computing environment.

In an embodiment, at 221, the network grid evaluation service generates one or more system events for the selective detected traffic that is assembled and detected pursuant to the global traffic pattern specifications. These events may then be raised by the network grid evaluation service within different processing environments over the network. The raised events can then trigger other services to take other actions within those processing environments.

In a specific case, at 222, the network grid evaluation service may raise these events in a secure manner by digitally signing the events. The signed events are then sent to a remediation manager service (also discussed in greater detail below) for subsequent enforcement of remediation policies; enforced by that remediation manager service.

At 230, the network grid evaluation service enforces one or more global policies to correlate the selective detected traffic being reported. In other words, a global policy ties the global traffic pattern specifications together and is enforced by the network grid evaluation service.

At 240, the network grid evaluation service uses the evaluation of the global policy to identify one or more actions to take. The policy may in some cases dictate that no action is to be taken. In other cases, a single action may be suggested. In still other situations, a plurality of actions may be recommended in response to the policy evaluation.

In an embodiment, at 250, the network grid evaluation service may automatically, dynamically, and in real time process at least one of the actions determined via the policy evaluation.

At 260, the network grid evaluation service can dynamically process one or more actions in real time to achieve a variety of goals. For example, actions can be processed to remediate a threat situation, such as blocking access to a particular website. Actions can also be taken to improve traffic throughput, such as routing traffic to a different grid or different grid members. The actions can be done in support of remediation or improved processing throughput for the grid computing environment as a whole, for a particular grid, and/or for a particular grid member.

According to an embodiment, at 270, the network grid evaluation service can also supply the global traffic patterns and the global traffic policy to a global grid manager on authorized request. This can permit the entire processing of the network grid evaluation service to be instantiated as another instance within the grid computing environment on a different processing device. This makes the processing even more portable and configurable within the grid computing environment.

Figure 3:
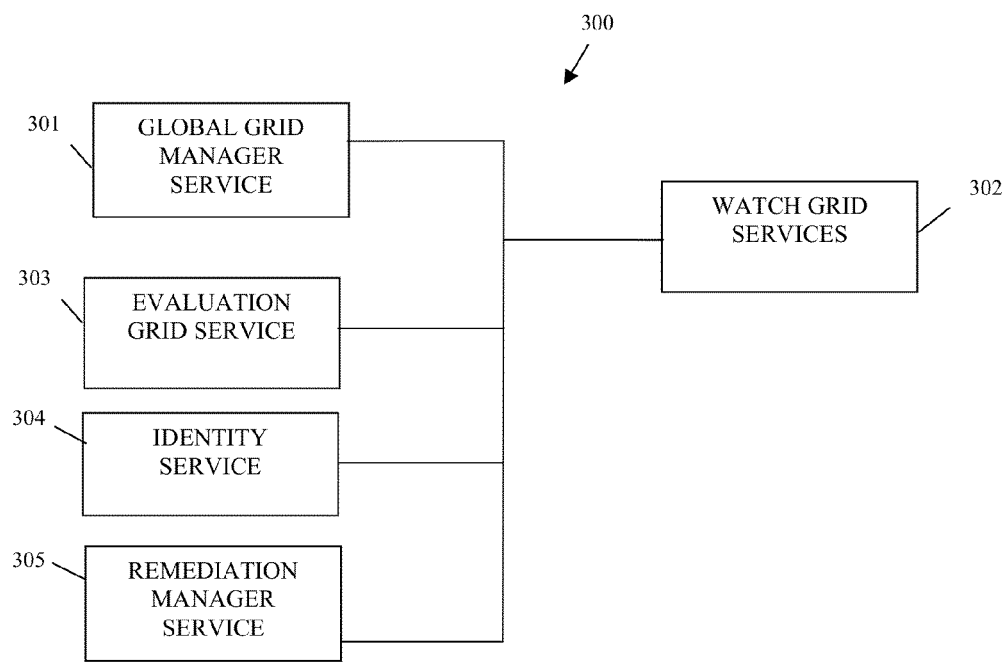
FIG. 3 is a diagram of network evaluation grid system, according to an example embodiment.

FIG. 3 is a diagram of network evaluation grid system 300, according to an example embodiment. The network evaluation grid system 300 is implemented as instructions on or within a machine-accessible and readable medium. The instructions when executed by a machine perform processing depicted with respect to the methods 100 and 200 of the FIGS. 1 and 2, respectively. The network evaluation grid system 300 is also operational over a network and the network may be wired, wireless, or a combination of wired and wireless. In an embodiment, the network is a WAN, such as the Internet.

The network evaluation grid system 300 includes a global grid manager service 301, a plurality of watch grid services 302, and a plurality of evaluation grid services 303. In some cases, the network evaluation grid system 300 may also include an identity service 304 and/or remediation manger service 305. Each of these and their interactions with one another will now be discussed in turn.

The global grid manager service 301 is embodied and implemented in a machine or computer accessible or readable medium and is to process on a machine of the network. Example processing associated with the global grid manager service 301 was presented above in detail with reference to the network grid monitoring service represented by the method 100 of the FIG. 1.

The global grid manager service 301 is to configure each of the watch grid services 302 with local traffic pattern specifications and local traffic pattern policies for detecting local traffic of interest on local machine or local processing devices or local processing environments associated with the watch grid services 302. The global grid manager service 301 is also to configure each of the evaluation grid services 303 with its global traffic pattern specifications and global traffic pattern policy.

The global grid manager service 301 also configures each watch grid service 302 to on what information or messages to generate in response to the local pattern specifications and policies.

In an embodiment, the global grid manager service 301 also configures at least two or more watch grid services 302 to coordinate with one another and to service monitoring network traffic for grid services occurring on a single grid. This may be done to alleviate load and processing throughput.

The watch grid services 302 are implemented in a machine accessible or readable medium and are to process on different machines of the network. Example processing associated with the watch grid services 302 was presented above in detail with reference to the network grid monitoring service and the network grid evaluation service represented by the methods 100 and 200 of the FIGS. l and 2, respectively.

Each watch grid service 302 processes on a particular grid of the grid computing environment. As mentioned above, in some cases, multiple watch grid services 302 can cooperate to handle the same grid of the grid computing environment. It is noted that in addition multiple ones of the evaluation grid services 303 can be configured to cooperate and interact with one another for purposes of performing network traffic evaluation and action processing.

Each watch grid service 302 is driven by the configuration done by the global grid manager service 301 and the local traffic pattern specifications and policies. This configuration information instructs each watch grid service 302 on what types of traffic to monitor and from whom (grid services and grid members) and what patterns to detect. The information also tells each watch grid service 302 whether a particular type of message is to be sent or not sent and to whom (evaluation grid service 303).

In an embodiment, the messages and information reported out by the watch grid services 302 are digitally signed before being sent to the evaluation grid service 303 for added and increased security.

The evaluation grid service 303 is implemented in a machine accessible or readable medium and is to process on a machine that is different from the machines used by the watch grid services 302. Example processing associated with the evaluation grid service 303 was presented above in detail with reference to the network grid evaluation service represented by the method 200 of the FIG. 1 and 2.

The evaluation grid service 303 is to use global traffic pattern specifications and one or more global traffic pattern policies to correlate detected traffic being reported via messages from the watch grid services 302 and to take actions in response to the correlated traffic. A single message from a single watch grid service 302 can spawn a chain of actions. Conversely, multiple messages from multiple watch grid services 302 can spawn a single action. Moreover, an action may be a recommendation to an administrator or it may be an automated process to achieve a desired end in response to one or more messages. Again, the messages are assimilated in response to evaluation of the global traffic pattern specifications and policies. It is also understood that there can be multiple evaluation grid services 303. Some may cooperate with others or some may be independent of others and coordinated by the global grid manager service 301.

In some cases, the network evaluation grid system 300 also includes an identity service 304. The identity service is embodied and implemented in a machine accessible or readable medium and is to process on a machine of the network. Example identity services were described and incorporated by reference above.

The identity service 304 supplies authentication mechanisms and identity information for each watch grid service 302, the global grid manager service 301, and the evaluation grid service 303. In some cases, the identity service 304 is also used to distribute the local traffic pattern specifications and policies in response to identity information supplied to or from the global grid manager service 301.

According to an embodiment, the network evaluation grid system 300 also includes a remediation manager service 305. The remediation manager service 305 is implemented in a machine-accessible or readable medium and is to process on a machine of the network.

The remediation manager service 305 responds to actions taken by the evaluation grid service 303. These actions alert the remediation manager service 305 to take measures on the network or within the grid computing environment to deal with a threat situation and/or to improve traffic throughput processing.

It is noted that the global grid manager service 301 may also include a global evaluation grid manager service that coordinates and configures multiple ones of the evaluation grid services 303. This arrangement can be achieved with the architecture depicted in FIG. 3 and as an independent feature of the global grid manager service 301. The same interaction and features between the global grid manager service 301 and the watch grid services can occur between the global evaluation grid manager service and the evaluation grid services 303.

Figure 4:
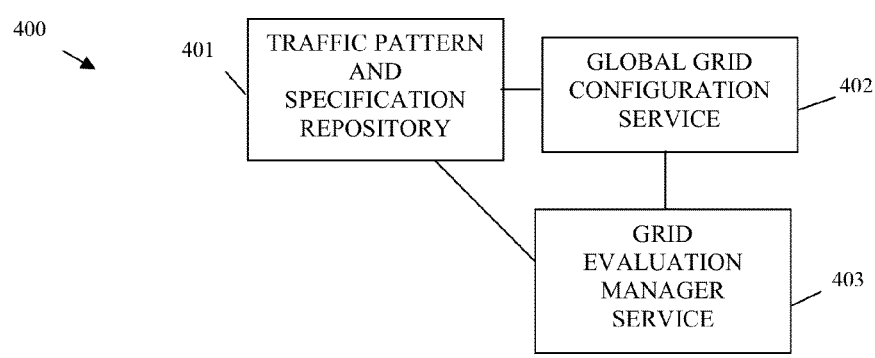
FIG. 4 is a diagram of another network evaluation grid system, according to an example embodiment.

FIG. 4 is a diagram of another network evaluation grid system 400, according to an example embodiment. The network evaluation grid system 400 is implemented as instructions on or within a machine-accessible and readable medium. The instructions when executed by a machine perform, inter alia; processing depicted with respect to the methods 100 and 200 the FIGS. 1 and 2, respectively. The network evaluation grid system 400 is also operational over a network and the network may be wired, wireless, or a combination of wired and wireless. In some cases, the network is a WAN, such as the Internet.

Moreover, the network evaluation grid system 400 represents an alternative perspective to the network evaluation grid system 300 represented by the FIG. 3 and discussed in detail above.

The network evaluation grid system 400 includes a traffic pattern specification and policy repository 401, a global grid configuration service 402, and a grid evaluation manager service 403. Each of these will now be discussed in turn.

The traffic pattern specification and policy repository 401 is storage and/or memory embodied in a machine-readable or accessible medium and capable of being read and modified by services that process on machines of the network. In an embodiment, the traffic pattern specification and policy repository 401 (hereinafter referred to as "repository 401") is a database, a data warehouse, a directory, a file, and/or various combinations of these things.

The format and content of the traffic pattern specifications and policies included within the repository 401 were discussed above in detail above. This information is configurable and can be predefined or can be automatically generated by automated services designed to produce the information in the format being used. The information identifies specific resources or authors of traffic being watched and specific types or patterns of the traffic. The policies also correlate multiple specifications and provide automated actions to take in response to detected conditions and events. The repository 401 houses and provides local traffic pattern specifications and local pattern policies to the global grid configuration service 402 and houses and provides global traffic pattern specifications and one or more global pattern policies to the grid evaluation manager service 403.

In an embodiment, the information housed in the repository 401 is indexed on and retrievable by identity information or identities associated with the watch grid services, identities associated with machines of the network, and/or identities associated with grid services that process on machines or grid members of the network and that produce the local traffic being monitored by the watch grid services. Again, the management, distribution, and coordination of identities and identity information can be acquired via an identity service, as detailed above.

The global grid configuration service 402 is implemented on a machine-accessible or readable medium and is processed on a machine of the network.

The global grid configuration service 402 acquires local traffic pattern specifications and policies from the repository 401 and configures multiple watch grid services (discussed above with reference to the FIGS. 1-3). Each watch grid service processes on a different machine associated with a grid computing environment. Moreover, each watch grid service monitors local traffic in accordance with its configured traffic pattern specifications and policies. Additionally, each watch grid service is configured by the global grid configuration service 402 to report local traffic to the grid evaluation manager service 403.

According to an embodiment, the global grid configuration service 402 configures at least two watch grid services to correlate local traffic monitoring and reporting with one another for a same grid of the grid computing environment.

In some cases, the global grid configuration service 402 is also used to configure the grid evaluation manager service 403 with its global traffic pattern specifications and global traffic pattern policy as acquired from the repository 401.

The grid evaluation manager service 403 is implemented on a machine-accessible or readable medium and is to process on the same machine as the global grid configuration service 402 or an entirely different machine of the network.

The grid evaluation manager service 403 acquires global traffic pattern specifications and one or more global traffic pattern policies from either the repository 401 or the global grid configuration service 402 (as discussed above in a particular embodiment). Moreover, the grid evaluation services evaluate local traffic received from the watch grid services in view of the global specifications and global policies to automatically, dynamically, and in real time take one or more actions.

According to an embodiment, the grid evaluation services takes one or more of the following actions making a recommendation or a particular action to an administrator, raising an event to a remediation manager service (discussed above with reference to the FIG. 3), and/or visually displaying on a particular monitor the local traffic being reported from the watch grid services.

It is noted that although the grid evaluation manager service 403 is discussed in the context of the evaluation services themselves that a distinction may be made in some architecture arrangements of the invention, such that there are actually separate services for managing or passing event information by the manager and the evaluation itself by policy is achieved by individual evaluation services. So, the discussion herein is to be understood within this context where there can be a delegation of responsibility between the evaluation manager 403 and the evaluation services themselves.

In an embodiment, the grid evaluation manager service 403 supplies the global traffic pattern specifications and the global traffic pattern policy to the global grid configuration service 402 on request. The global grid configuration service 402 uses this information to initiate another instance of the grid evaluation manager service 403 on the network.

It is also noted that in a particular embodiment, the network for the grid computing environment is a WAN that includes Internet connectivity.

Figure 5:
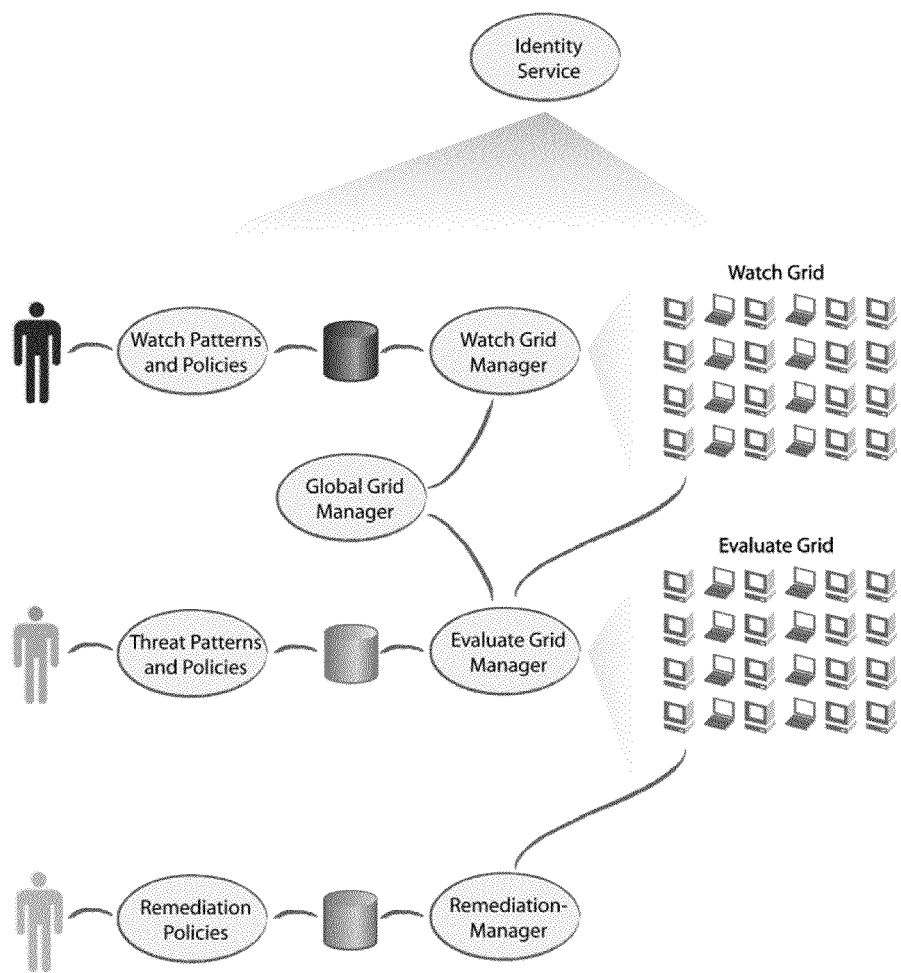
FIG. 5 is a diagram for an example architectural arrangement of a network evaluation grid system, according to an example embodiment.

FIG. 5 is a diagram for an example architectural arrangement of a network evaluation grid system, according to an example embodiment. The components and arrangement of the architectural components are presented for purposes of illustration and comprehension. Therefore, it is understood that other components or arrangements are achievable without departing from the beneficial teachings presented herein.

FIG. 5 is discussed in terms of example components and their interactions with one another. Again, this is an example illustration of an implementation for the invention and is not to be considered limiting in any manner to the particular embodiments discussed with respect to FIG. 5.

Initially, an identity service establishes the identity of each grid process and traffic pattern specification. The same or even a different identity service also establishes the identity of each message sent from each grid process (grid service).

A process that specifies "Watch Patterns" and "Watch Policies" (watch grid service) that specify the patterns to be watched for and policies to govern the recognition of a pattern. For example, often a threat pattern is a combination of several TCP packets dispersed over time where multiple patterns recognized over a period of time finally identifies a threat. It is the policy that correlates multiple patterns over time.

A Global Grid Manager is used for coordinating the grid computing environment. Moreover, a Watch Grid Manager coordinates with the Global Grid Manager to distribute as needed the Watch Grid mechanism, patterns, and policies.

Note that the Watch Grid and Evaluate Grid may have grid members in common. It is not necessary that all grid computers do both the Watch and Evaluate mechanism. Yet, the Watch Grid is constructed to have broad coverage over the network being evaluated.

A Watch Process that is a grid-enabled process is shown. This process uses the local NICs (Network Interface Cards) in promiscuous mode to listen to the traffic on its local segment. Packets are evaluated according to the pattern and policy specifications. This is novel in this point because each Watch Grid member is evaluating the network traffic and watching for identifiable patterns that match policy. Current art has each computer monitoring itself for threats which leaves the monitoring mechanism open to compromise. The teaching herein provides for the potential of many monitors on a network segment all watching for patterns that match policy. Thus a compromised computer need not declare itself but will be declared by one or more grid members watching the local segment. Thus, it is ensured that the Global and Watch Grid Managers make sure that Watch Grid members are located on each unique local segment to assure broad but complete coverage.

The various Watch grid processes send a signed message to the Evaluate Grid Manager as information to be processed.

A process, which specifies "Evaluate Patterns" and "Evaluate Policies," is used to specify the Watch pattern interactions that determine an event, which requires remediation. For example, the Watch patterns may indicate that an entire subnet has been compromised and that a switch or router needs to be disabled rather than just a single machine.

An Evaluate Grid Manager is provided that coordinates with the Global Grid Manager to distribute as needed the Evaluate Grid mechanism, patterns, policies, and Watch data.

Events found during Evaluation are signed and sent to the Remediation Manager where the remediation policies are enforced.

Grid members can come and go and can be reassigned in a dynamic and real-time fashion.

Note that if a single Watch grid member is not able to process all network traffic the teachings presented herein continue to be effective because other grid members on that local segment will tend to pick up the missed traffic. In an embodiment, a coordinating mechanism is provided for assuring that no packet is missed.

An example of remediation is the correlation of Uniform Resource Locator (URL) links visited by many web browsers whose hosting system is infected with a virus. In this case remediation includes putting the URL or domain on a black list to prevent further infection.

An example of positive remediation is the finding of a very fast router path to an important resource and the modifying of the appropriate router tables on the fly (real time and dynamic) to take advantage of the better path.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing in a non-transitory computer-readable storage medium, comprising:
   identifying grid services that are distributed over a network for processing on a plurality of devices, wherein the plurality of devices combine to form a grid computing environment and selective collections of the devices combine to form a particular grid of the grid computing environment, each grid service listens for data packets on its grid; and configuring and distributing a watch grid service with each grid of the grid computing environment, and when initiated on a particular device of the particular grid, a particular watch grid service listens for and reports on traffic in response to enforcement of particular ones of traffic pattern specifications, and when the particular watch grid service is loaded and cannot capture all the traffic another watch grid service cooperates to capture packets associated with the traffic that was missed.

2. The method of claim 1, wherein identifying further includes obtaining the traffic pattern specifications for the following: a particular one of the grid services, selective groupings of the grid services, the particular grid, selective groupings of the grids, and the grid computing environment as a whole.

3. The method of claim 1, wherein configuring and distributing further includes configuring and distributing with each watch grid service traffic pattern policies, wherein the particular watch grid service enforces particular ones of the traffic pattern policies to correlate multiple traffic pattern specifications with one another.

4. The method of claim 1, wherein configuring and distributing further includes determining traffic pattern policies for one or more of the following: selective groupings of the traffic pattern specifications and the grid computing environment as a whole.

5. The method of claim 1, wherein configuring and distributing further includes using each traffic pattern specification to identify a particular grid member and that grid member's subnet permitting traffic emanating from that grid member to be monitored independent of resources producing that traffic.

6. The method of claim 1, wherein identifying further includes configuring each grid as its own independent local area network (LAN) for the grid computing environment as a whole.

7. The method of claim 6, wherein identifying further includes configuring each grid service to monitor the data packets by listening from the data packets on network interface cards of the LAN.

8. A method implemented and residing in a non-transitory computer-readable storage medium for executing on a processing device, comprising:

receiving, by the processing device, messages from multiple watch grid services, wherein each watch grid service reports network traffic occurring on grid members associated with a grid computing environment in response to local traffic pattern specifications and local traffic pattern policies, and wherein receiving includes passing control to another watch grid service to pick up any missed traffic when a particular watch grid service cannot handle all the traffic;

using, by the processing device, global traffic patterns to detect selective traffic being reported, each of the global traffic patterns identifies a particular grid member and a subnet for traffic emanating from that particular grid member to be monitored independent of resources producing that traffic;

enforcing, by the processing device, a global traffic policy to correlate the selective traffic; and identifying, by the processing device, actions to take in response to enforcement of the global traffic policy.

9. The method of claim 8, wherein receiving further includes processing each watch grid service to monitor packets emanating from network interface cards associated with devices that that watch grid service monitors.

10. The method of claim 8, wherein using further includes using the global traffic pattern specifications to tie the messages on the network traffic occurring from the grid members together.

11. The method of claim 8 further comprising, generating, by the processing device, events for selective traffic and raising those events to selective processing environments to trigger other services and other actions.

12. The method of claim 11, wherein generating further includes signing one or more of the events.

13. The method of claim 8 further comprising, signing, by the processing device, each message.

14. A system, comprising:

a global grid manager service implemented in a non-transitory computer-readable storage medium and to process on a machine within a network;

watch grid services implemented in a non-transitory computer-readable storage medium, each grid service processes on a different machine of the network; and an evaluation grid service implemented in a non-transitory computer-readable storage medium and to process on a machine different from those machines used by the watch grid services, wherein the global grid manager service is to configure each of the watch grid services with local traffic pattern specifications and local traffic pattern policies for detecting local traffic on local machines or local processing environments of the watch grid services, each watch grid service is to report all the detected traffic to the evaluation grid service that emanates from a network interface card of local machines associated with that watch grid service, wherein the evaluation grid service is to use global traffic pattern specifications and enforce a global traffic pattern policy to correlate the detected traffic and take one or more actions in response to the correlated traffic, and wherein, when a particular watch grid service is unable to handle all the traffic, another watch grid service cooperates to capture any missed traffic.

15. The system of claim 14, wherein each global traffic pattern specification identifies a particular grid member and that grid member's subnet permitting traffic emanating from that grid member to be monitored independent of resources producing that traffic.

16. The system of claim 14 further comprising, a remediation manager service implemented in a non-transitory computer-readable storage medium and to process on a machine of the network, wherein the actions taken by the evaluation grid service alerts the remediation manager service to take measures on the network to deal with a threat situation or to improve traffic throughput processing.

17. The system of claim 14, wherein the watch grid services report to the evaluation grid service via encrypted messages.

18. The system of claim 14, wherein at least two of the watch grid services are configured to coordinate traffic watching with one another.

* * * * *